United States Patent
Vahid Far et al.

(10) Patent No.: US 9,547,324 B2
(45) Date of Patent: Jan. 17, 2017

(54) POWER-EFFICIENT, LOW-NOISE, AND PROCESS/VOLTAGE/TEMPERATURE (PVT)—INSENSITIVE REGULATOR FOR A VOLTAGE-CONTROLLED OSCILLATOR (VCO)

(71) Applicant: QUALCOMM Incorporated, San Diego, CA (US)

(72) Inventors: Mohammad Bagher Vahid Far, San Jose, CA (US); Abbas Komijani, Mountain View, CA (US); Chan Hong Park, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 104 days.

(21) Appl. No.: 14/244,321

(22) Filed: Apr. 3, 2014

(65) Prior Publication Data

US 2015/0286235 A1 Oct. 8, 2015

(51) Int. Cl.
*G05F 3/26* (2006.01)
*G05F 3/02* (2006.01)

(52) U.S. Cl.
CPC ............... *G05F 3/02* (2013.01); *G05F 3/262* (2013.01)

(58) Field of Classification Search
CPC ........................... G05F 3/262; G05F 3/26
USPC ................................ 323/315, 316
See application file for complete search history.

(56) References Cited

U.S. PATENT DOCUMENTS 5,357,149 A * 10/1994 Kimura ................ G01K 7/01
327/512
5,475,343 A * 12/1995 Bee ................. H03F 3/3001
330/255
5,764,041 A   6/1998 Pulvirenti et al.
6,492,796 B1  12/2002 Morley
(Continued)

FOREIGN PATENT DOCUMENTS

EP    0518714 A1    12/1992
EP    0899643 A1    3/1999

OTHER PUBLICATIONS

Zhao B., et al., "A 1.41-1.72 GHz sigma-delta fractional-N frequency synthesizer with a PVT insensitive VCO and a new prescaler," Analog Integrated Circuits and Signal Processing, 2009, vol. 59, pp. 265-273.
(Continued)

*Primary Examiner* — Timothy J Dole
*Assistant Examiner* — Sisay G Tiku
(74) *Attorney, Agent, or Firm* — Patterson & Sheridan, L.L.P.

(57) ABSTRACT

Certain aspects of the present disclosure provide voltage regulating circuits which are power efficient, low noise, and substantially insensitive to changes in process technology, power supply voltage, and temperature. Such circuits may be used to provide the regulated voltage for a voltage-controlled oscillator (VCO), for example, as found in a radio frequency front end (RFFE). One example voltage regulating circuit generally includes a current source configured to supply or sink a reference current and a current mirror having a bias branch and a main branch, wherein the bias branch is connected with the current source, wherein the main branch includes a source follower to provide the regulated voltage, and wherein the reference current is available at a node for the regulated voltage.

26 Claims, 9 Drawing Sheets

(56) References Cited

U.S. PATENT DOCUMENTS

| | | | |
|---|---|---|---|
| 7,061,337 B2 | 6/2006 | Partovi et al. | |
| 8,222,884 B2* | 7/2012 | Arnold | G05F 3/205 |
| | | | 323/315 |
| 8,400,220 B1* | 3/2013 | Joffe | H03F 1/301 |
| | | | 330/264 |
| 2003/0076158 A1 | 4/2003 | Rajan | |
| 2004/0056708 A1 | 3/2004 | Bedarida et al. | |
| 2005/0162218 A1* | 7/2005 | Noda | G05F 1/575 |
| | | | 327/541 |
| 2005/0226051 A1* | 10/2005 | Bedarida | G05F 3/262 |
| | | | 365/185.18 |
| 2007/0194838 A1* | 8/2007 | Mosinskis | G05F 3/262 |
| | | | 327/543 |
| 2007/0200545 A1* | 8/2007 | Loi | G05F 3/262 |
| | | | 323/315 |
| 2008/0024343 A1 | 1/2008 | Rose et al. | |
| 2008/0088379 A1 | 4/2008 | Chen | |
| 2009/0002048 A1* | 1/2009 | Fujisawa | G05F 3/30 |
| | | | 327/306 |
| 2009/0085534 A1 | 4/2009 | Ko et al. | |
| 2009/0128238 A1* | 5/2009 | Lin | H03F 3/3022 |
| | | | 330/253 |
| 2009/0302824 A1 | 12/2009 | Kim et al. | |
| 2010/0120383 A1* | 5/2010 | Kikuchi | H03F 3/45273 |
| | | | 455/114.2 |
| 2010/0225384 A1* | 9/2010 | Hirose | G05F 3/242 |
| | | | 327/543 |
| 2011/0298497 A1* | 12/2011 | Nishijima | H03K 5/2472 |
| | | | 327/63 |
| 2011/0304362 A1 | 12/2011 | Matsubara | |
| 2012/0038332 A1 | 2/2012 | Lin | |
| 2012/0223781 A1 | 9/2012 | Chen et al. | |
| 2012/0228136 A1* | 9/2012 | Levine | H01L 27/14632 |
| | | | 204/406 |
| 2012/0256613 A1* | 10/2012 | Bellaouar | H04B 15/06 |
| | | | 323/314 |
| 2013/0271095 A1 | 10/2013 | Jackum et al. | |
| 2015/0077188 A1* | 3/2015 | Zhan | H03F 3/505 |
| | | | 330/307 |

OTHER PUBLICATIONS

International Search Report and Written Opinion—PCT/US2015/019951—ISA/EPO—Sep. 4, 2015.
Partial International Search Report—PCT/US2015/019951—ISA/EPO—Jun. 9, 2015.
Ramirez-Angulo J., et al., "Compact Implementation of High-Performance CMOS Current Mirror," Electronics Letters, IEEE Stevenage, GB, vol. 41, No. 10, May 12, 2005 (May 12, 2005), pp. 570-572, XP006024037, ISSN: 0013-5194, DOI: 10.1049/EL:20051122.

* cited by examiner

POWER-EFFICIENT, LOW-NOISE, AND PROCESS/VOLTAGE/TEMPERATURE (PVT)—INSENSITIVE REGULATOR FOR A VOLTAGE-CONTROLLED OSCILLATOR (VCO)

TECHNICAL FIELD

Certain aspects of the present disclosure generally relate to electronic circuits and, more particularly, to providing a power-efficient, low-noise, and PVT-insensitive voltage regulator, which may be used to generate the regulated voltage for a VCO, for example.

BACKGROUND

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1xRTT (1 times Radio Transmission Technology, or simply 1x), W-CDMA (Wideband Code Division Multiple Access), UMTS-TDD (Universal Mobile Telecommunications System-Time Division Duplexing), HSPA (High Speed Packet Access), GPRS (General Packet Radio Service), or EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems. Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3rd Generation Partnership Project (3GPP) Long Term Evolution (LTE) networks, and Long Term Evolution Advanced (LTE-A) networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

SUMMARY

Certain aspects of the present disclosure generally relate to voltage regulating circuits which are power efficient, low noise, and substantially insensitive to changes in process technology, power supply voltage, and temperature. Such circuits may be used to provide the regulated voltage for a voltage-controlled oscillator (VCO), for example, as found in a radio frequency front end (RFFE).

Certain aspects of the present disclosure provide a circuit for outputting a regulated voltage. The circuit generally includes a current source configured to supply or sink a reference current and a current mirror having a bias branch and a main branch, wherein the bias branch is connected with the current source, wherein the main branch includes a source follower to provide the regulated voltage, and wherein the reference current is available at a node for the regulated voltage.

According to certain aspects, the bias branch includes a first transistor, the main branch includes a second transistor, and a gate of the first transistor is connected with a gate of the second transistor. A drain of the first transistor may be connected with the gate of the first transistor. For certain aspects, the bias branch includes a third transistor connected in cascode with the first transistor, the main branch includes a fourth transistor connected in cascode with the second transistor, and a gate of the third transistor is connected with a gate of the fourth transistor. In this case, the circuit further includes a first power supply level connected with the current source and a second power supply level connected with the main branch of the current mirror. The first power supply level may have a higher voltage than the second power supply level. The gate of the third transistor may be biased using a voltage divider connected with the second power supply level. The gate of the third transistor may be connected with the gate of the fourth transistor via a first low pass filter, and the gate of the first transistor may be connected with the gate of the second transistor via a second low pass filter. For certain aspects, a drain of the third transistor may be connected with the current source and the gate of the first transistor, a source of the third transistor may be connected with a drain of the first transistor, and a source of the first transistor may be connected with the node for the regulated voltage. For certain aspects, a drain of the fourth transistor may be connected with the second power supply level, a source of the fourth transistor may be connected with a drain of the second transistor, and a source of the second transistor may be connected with the node for the regulated voltage. For certain aspects, the first, second, third, and fourth transistors are n-channel metal-oxide semiconductor (NMOS) field-effect transistors.

According to certain aspects, the reference current and a branch current through the main branch compose a regulator current available at the node for the regulated voltage, and the regulator current is substantially insensitive to variations in process technology, power supply voltage, and temperature.

According to certain aspects, the current source is a variable current source.

According to certain aspects, the regulated voltage is configured to power a voltage-controlled oscillator (VCO).

According to certain aspects, the current mirror is a low impedance current mirror.

According to certain aspects, the source follower includes a p-channel metal-oxide semiconductor (PMOS) field-effect transistor.

Certain aspects of the present disclosure provide a circuit for outputting a regulated voltage. The circuit generally includes a source follower configured to provide the regulated voltage; a current sensing circuit configured to measure a sensing current corresponding to a regulated current available at a node for the regulated voltage; a current source configured to supply a reference current; and a current mode comparator configured to compare the sensing current with the reference current and control a bias of the source follower based on the comparison.

According to certain aspects, the circuit further includes a power supply level connected with the source follower, the current sensing circuit, the current source, and the current mode comparator. The regulator current may be substantially insensitive to variations in process technology, a voltage of the power supply level, and/or temperature. For certain aspects, the source follower includes a first transistor and a second transistor connected in series. In this case, a gate of the first transistor may be biased using a voltage divider connected with the power supply level. A source of the first transistor may be connected with a drain of the second transistor, and a source of the second transistor may be connected with the node for the regulated voltage. An output of the current mode comparator may be connected with a gate of the second transistor via a low pass filter. For certain aspects, the circuit further includes a switch in parallel with a resistor of the low pass filter. The switch may be closed during start-up of the circuit and may be open during normal operation of the circuit.

According to certain aspects, the current sensing circuit includes third, fourth, fifth, and sixth transistors connected in series. In this case, a drain of the third transistor may be connected with the power supply level, a gate of the third transistor may be connected with a gate of the first transistor, a source of the third transistor may be connected with a drain of the fourth transistor, a gate of the fourth transistor may be connected with a gate of the second transistor, a source of the fourth transistor may be connected with a drain of the fifth transistor, and a source of the fifth transistor may be connected with a drain of the sixth transistor. For certain aspects, the current sensing circuit includes an amplifier having a negative input, a positive input, and an output. The negative input may be connected with the node for the regulated voltage, the positive input may be connected with at least one of the source of the fourth transistor or the drain of the fifth transistor, and the output may be connected with a gate of the sixth transistor, such that the sensing current flows through the third, fourth, fifth, and sixth transistors. A gate of the fifth transistor may be biased by a bias voltage. For certain aspects, the gate of the fifth transistor is configured to be connected with an electrical ground for the power supply level during start-up of the circuit.

According to certain aspects, the current mode comparator includes a seventh transistor and an eighth transistor connected in series. A drain of the seventh transistor may be connected with the current source and with the gate of the second transistor to form a feedback loop for controlling the bias of the source follower, a gate of the seventh transistor may be connected with a gate of the fifth transistor, a source of the seventh transistor may be connected with a drain of the eighth transistor, and a gate of the eighth transistor may be connected with a gate of the sixth transistor.

According to certain aspects, the first, second, third, fourth, fifth, and sixth transistors include n-channel metal-oxide semiconductor (NMOS) field-effect transistors.

According to certain aspects, the current source comprises a variable current source.

According to certain aspects, the circuit further includes a switch in parallel with the current source. The switch may be closed during start-up of the circuit and may be open during normal operation of the circuit.

According to certain aspects, the regulated voltage is configured to power a VCO.

According to certain aspects, the source follower includes a p-channel metal-oxide semiconductor (PMOS) field-effect transistor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

An Example Wireless System

Figure 1:
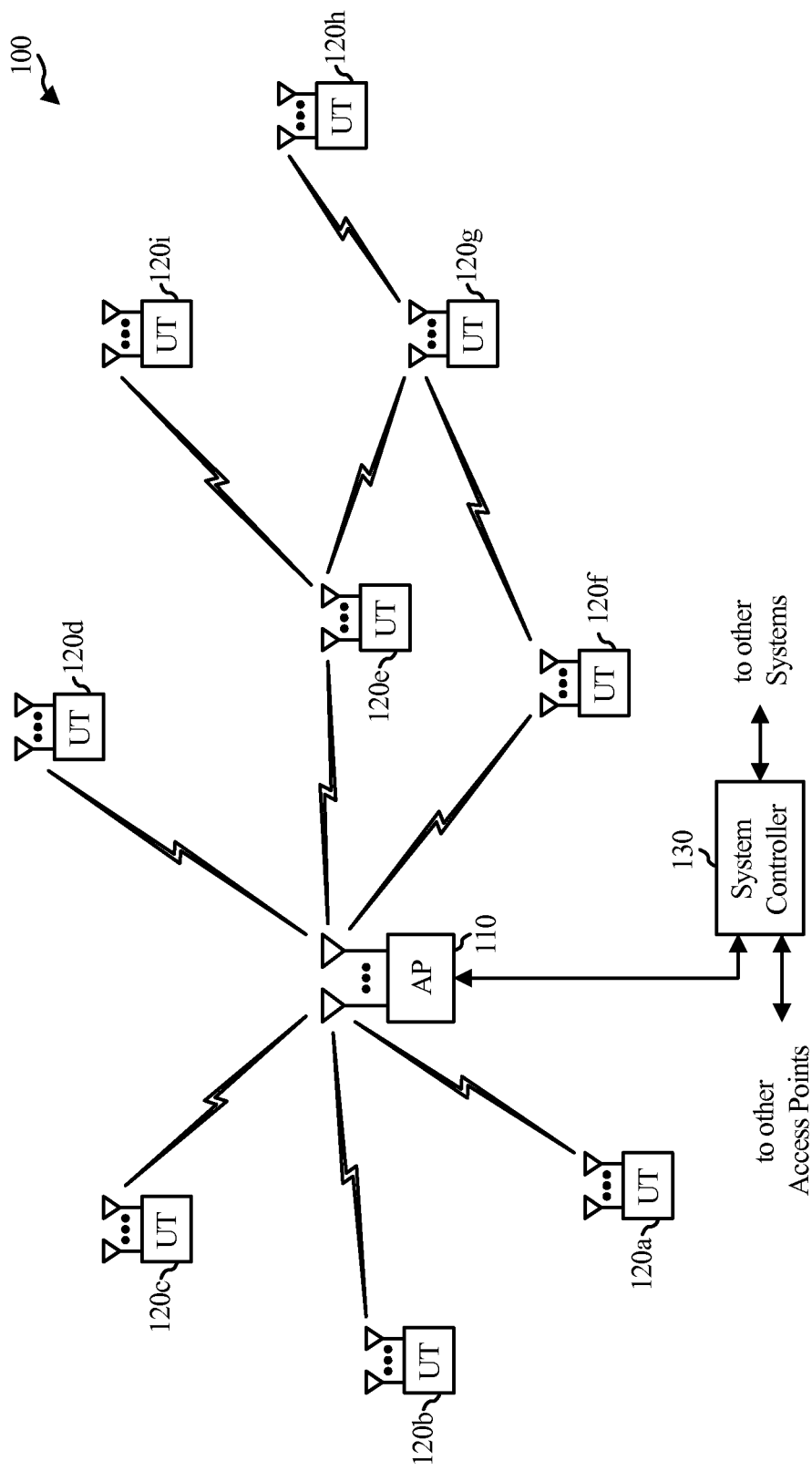
FIG. 1 is a diagram of an example wireless communications network in accordance with certain aspects of the present disclosure.

FIG. 1 illustrates a wireless communications system 100 with access points and user terminals. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
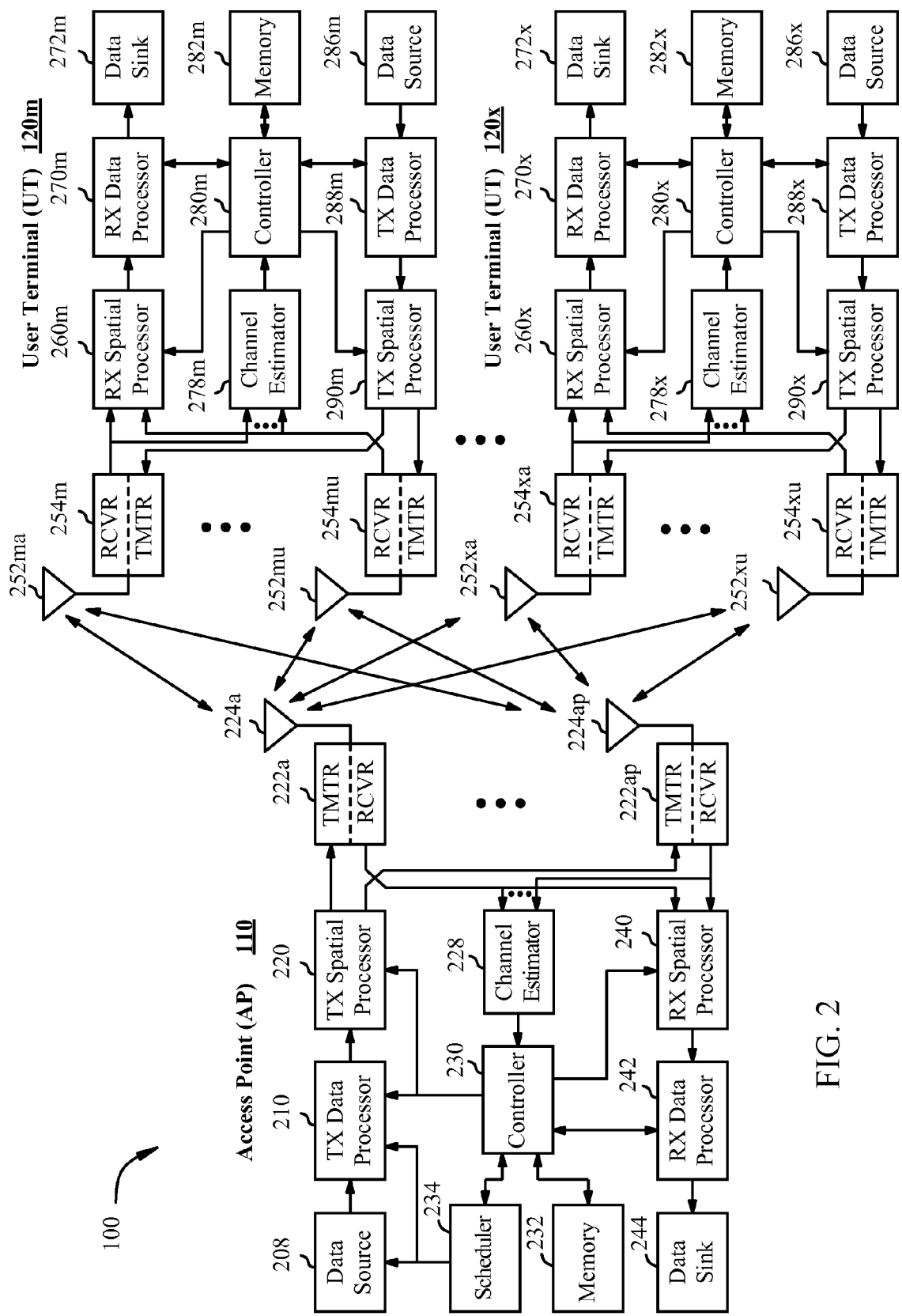
FIG. 2 is a block diagram of an example access point (AP) and example user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

Example Voltage Regulators

A local oscillator (LO) is typically included in radio frequency front-ends (RFFEs), such as transceiver front end 222 or 254, to generate a signal utilized to convert a signal of interest to a different frequency using a mixer. Known as heterodyning, this frequency conversion process produces the sum and difference frequencies of the LO frequency and the frequency of the signal of interest. The sum and difference frequencies are referred to as the beat frequencies. While it is desirable for the output of an LO to remain stable in frequency, tuning to different frequencies indicates using a variable-frequency oscillator, which involves compromises between stability and tunability. Contemporary systems employ frequency synthesizers with a voltage-controlled oscillator (VCO) to generate a stable, tunable LO with a particular tuning range.

A VCO regulator is typically employed to provide VCO bias voltage/current. Some VCO regulators may utilize a current mirror. For certain regulators, a feedback loop is used to sense the VCO voltage (the regulated voltage) and adjust the VCO current. The regulator may contribute significantly to VCO phase noise and usually consumes power comparable to the VCO. It is generally desirable for the regulator current to be process, voltage, and temperature (PVT)-independent; otherwise, the variation of VCO current/voltage that would occur with process, voltage, and/or temperature change may affect the VCO swing and degrade the phase noise performance. The VCO regulator may also be specified to be accurate (providing the desired current/voltage), low noise, power efficient, capable of working with low supply voltage (e.g., in advanced CMOS technology), and compact for layout purposes.

Figure 3:
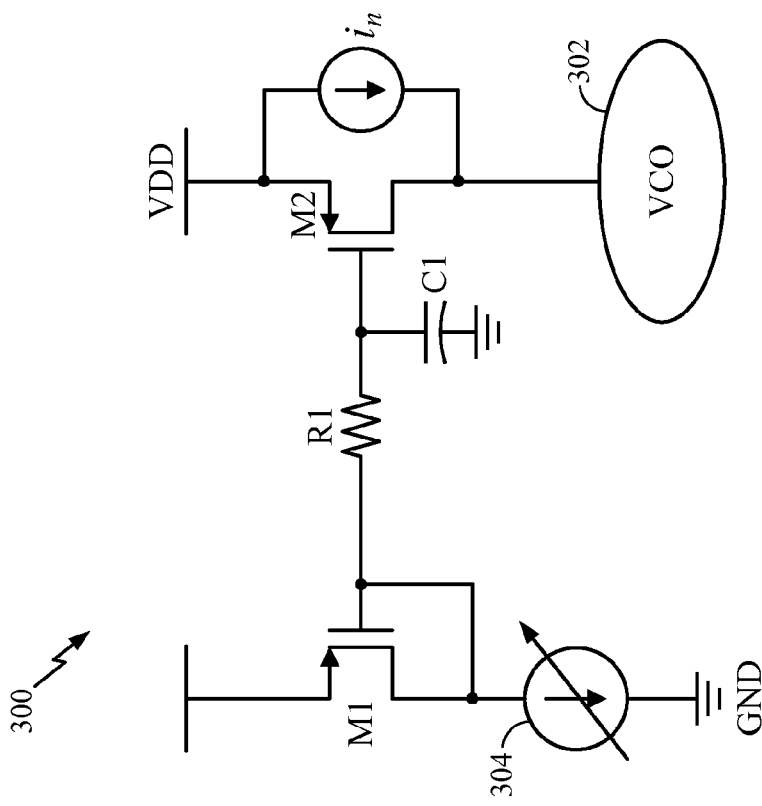
FIG. 3 is a schematic diagram of an example voltage regulating circuit using a PMOS current mirror and a current sink.

FIG. 3 is a schematic diagram of an example voltage regulating circuit 300 for supplying a regulated voltage (Vreg) to a VCO 302. Receiving power from a power supply level (i.e., a rail) labeled VDD, the circuit 300 uses a PMOS current mirror and a reference current source 304 as a current sink. In the current mirror, the drain and the gate of PMOS transistor M1 are connected together, and the drain of PMOS transistor M2 is connected to the VCO 302. Resistor R1 and capacitor C1 may form a low pass filter between the gates of transistors M1 and M2. In this manner, transistor M1 forms a bias branch of the current mirror, and transistor M2 forms a main branch, in which transistor M2 is biased such that the current in the main branch (i.e., the current supplied to the VCO 302) replicates (i.e., "mirrors") the reference current flowing in the bias branch through transistor M1. The reference current source 304 may be a variable source, as illustrated in FIG. 3. For other aspects, an NMOS current mirror may be combined with the reference current source 304 supplying current (rather than sinking current) in the bias branch.

Figure 7A:
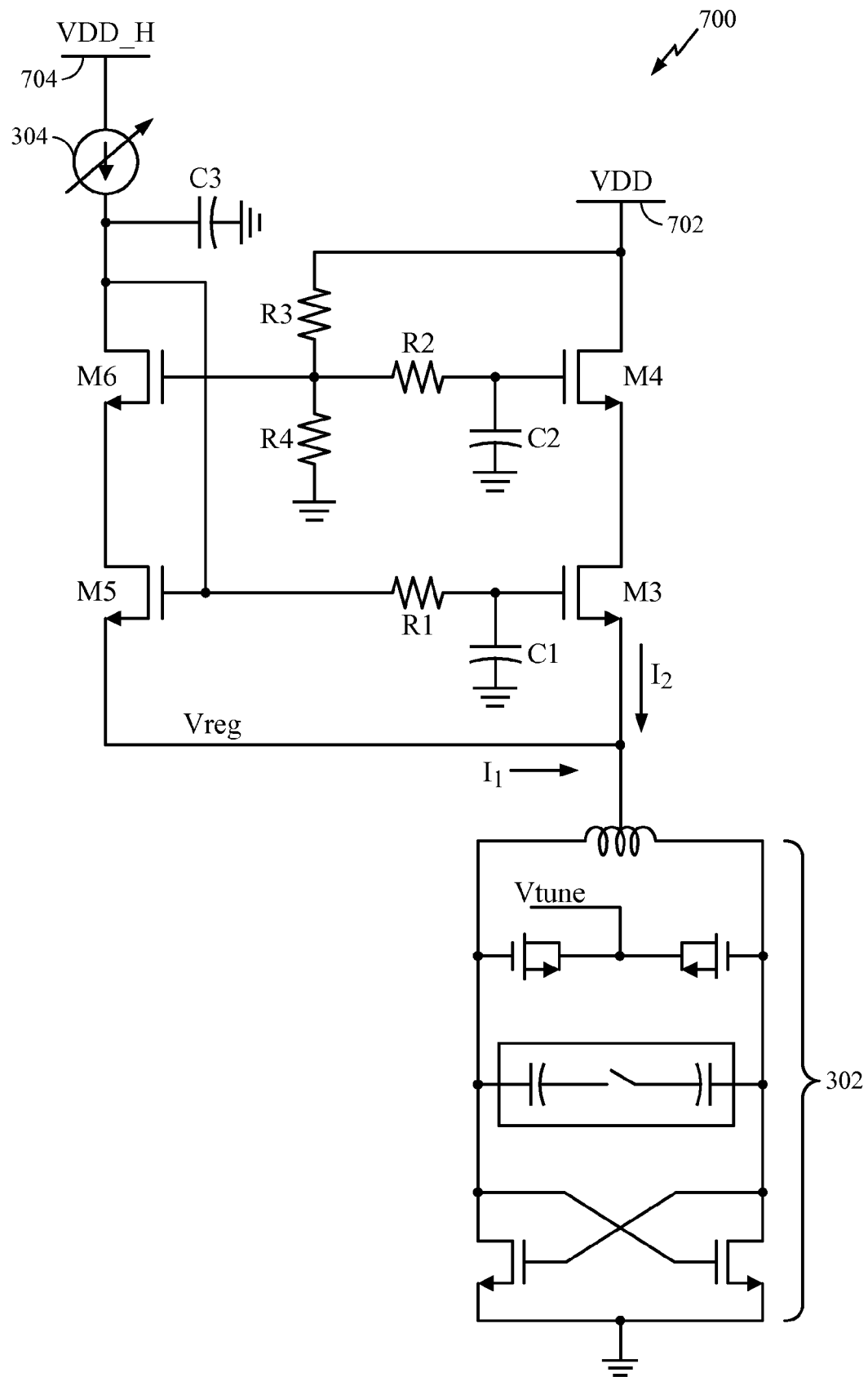
FIG. 7A is a schematic diagram of an example voltage regulating circuit using an NMOS cascode source follower where the reference current is supplied as part of the VCO current, in accordance with certain aspects of the present disclosure.

By using a PMOS or NMOS current mirror in this manner, the contribution of the current source noise to the phase noise is high. All of the current source noise ($i_n$) is injected to the VCO 302 and up-converted to the VCO's oscillation frequency, since the cross-coupled transistors in the active negative transconductance circuit of the VCO 302 (as illustrated in FIG. 7A) provide a low-impedance path for the noise at the drain of transistor M2. In addition, the regulated current in the main branch varies over PVT due to the limitations of the current mirror, and this topology is not suitable for scaled CMOS. Furthermore, the current in the bias branch, which is comparable to the VCO current, is wasted by being sunk to electrical ground (GND).

Figure 4:
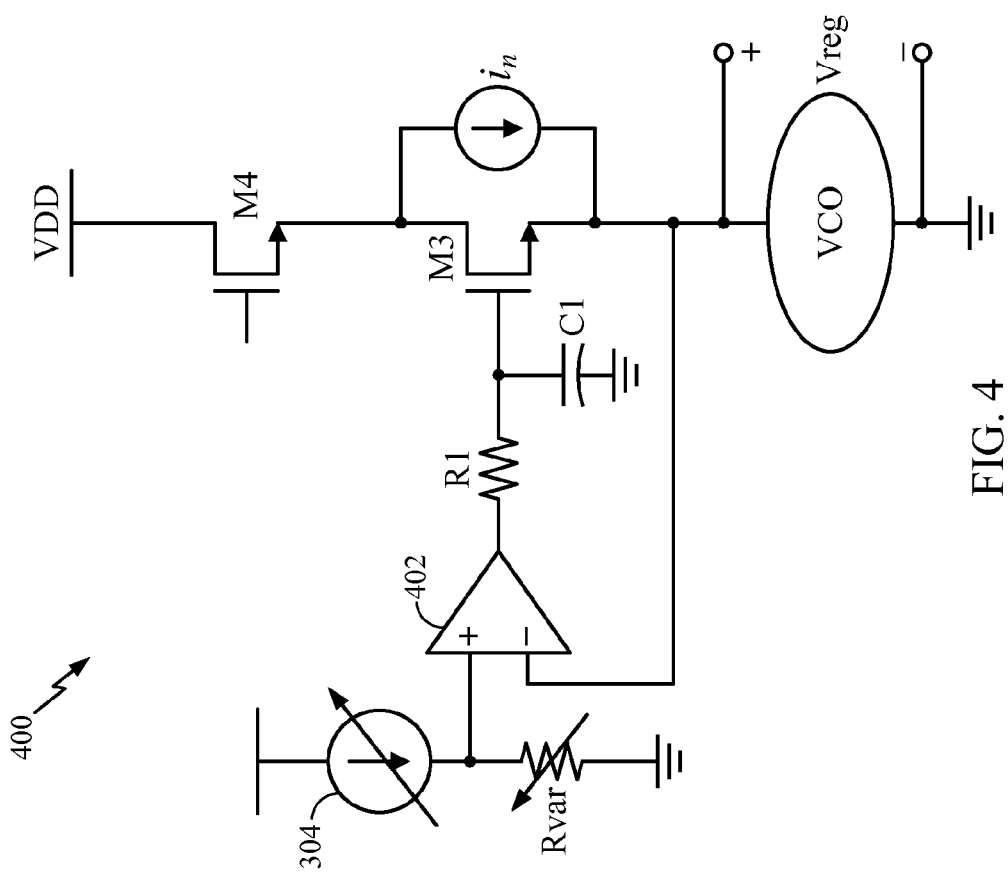
FIG. 4 is a schematic diagram of an example voltage regulating circuit using an NMOS source follower with feedback.

FIG. 4 is a schematic diagram of another example voltage regulating circuit 400 for supplying a regulated voltage (Vreg) to the VCO 302 using an NMOS source follower with feedback. In the circuit 400, NMOS transistors M3 and M4 are connected in cascode. Biasing for transistor M4 is not shown, but is understood by a person having ordinary skill in the art. The gate of transistor M3 is driven by an operational amplifier (op amp) 402 whose output is low-pass filtered with resistor R1 and capacitor C1 and whose negative terminal receives feedback from the source of transistor M3 (i.e., Vreg). The positive terminal of the amplifier 402 is connected to a reference voltage, which may be generated by the reference current source 304 and a variable resistance (Rvar), for example. In operation with proper biasing of the circuit 400, the amplifier 402 will drive the gate of transistor M3 such that the voltage at the source of transistor M3 is equal to the reference voltage sensed by the amplifier.

By using this source follower topology instead of a current mirror, the voltage regulating circuit 400 of FIG. 4 has better phase noise than the circuit 300 in FIG. 3. The problem with this scheme is that the regulated voltage (Vreg) is held constant by the feedback loop. For most VCO topologies, however, the current will change over PVT. What is actually desired then is a mechanism to fix the VCO current (and hence its swing) and automatically change the voltage applied to the VCO over PVT.

Figure 5:
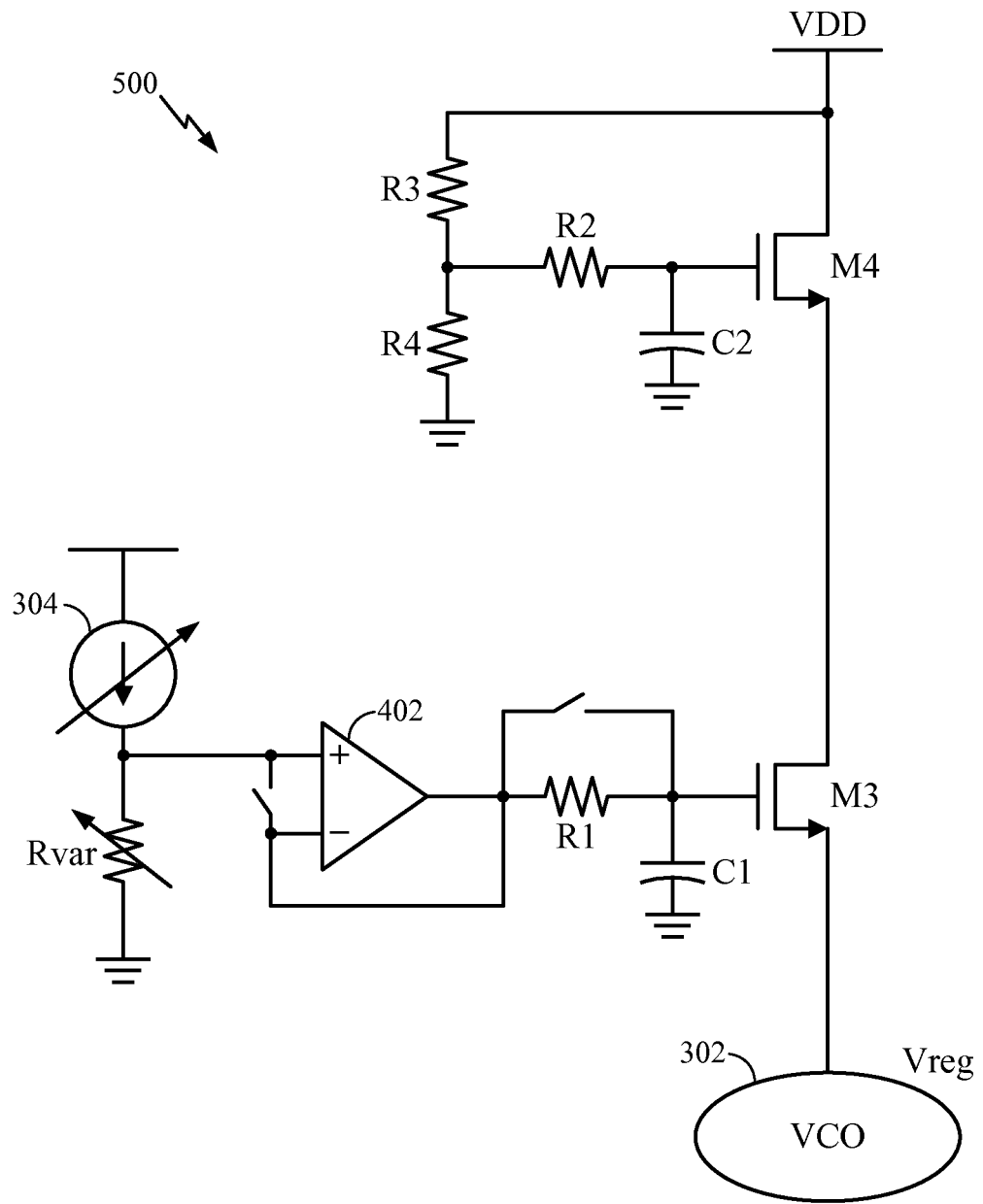
FIG. 5 is a schematic diagram of an example voltage regulating circuit using an NMOS source follower without feedback at the source follower.

Similar to FIG. 4, FIG. 5 is a schematic diagram of an example voltage regulating circuit 500 using an NMOS source follower, but without feedback at the source follower. In the circuit 500, the gate of NMOS transistor M4 is low-pass filtered by resistor R2 and capacitor C2 and biased with a voltage divider formed from resistors R3 and R4. Instead of sensing the source of transistor M3 as in circuit 400, the amplifier 402 is configured as a buffer, such that the output voltage of the amplifier—which is nearly equivalent to the reference voltage created by the reference current source 304 and the variable resistance—drives the gate of transistor M3. In other words, rather than setting the reference voltage (Vref) at the regulated voltage (Vreg), Vref will be set to a voltage that biases the gate of transistor M3 to achieve the desired Vreg, given the VCO current.

In the circuit 500, the noise sources at the source follower are filtered, and part of the noise of transistor M3 will circulate back inside this transistor. However, the reference voltage may change with PVT, and without any additional feedback, the VCO current variation in the circuit 500 will be worse than in the circuit 400.

Figure 6:
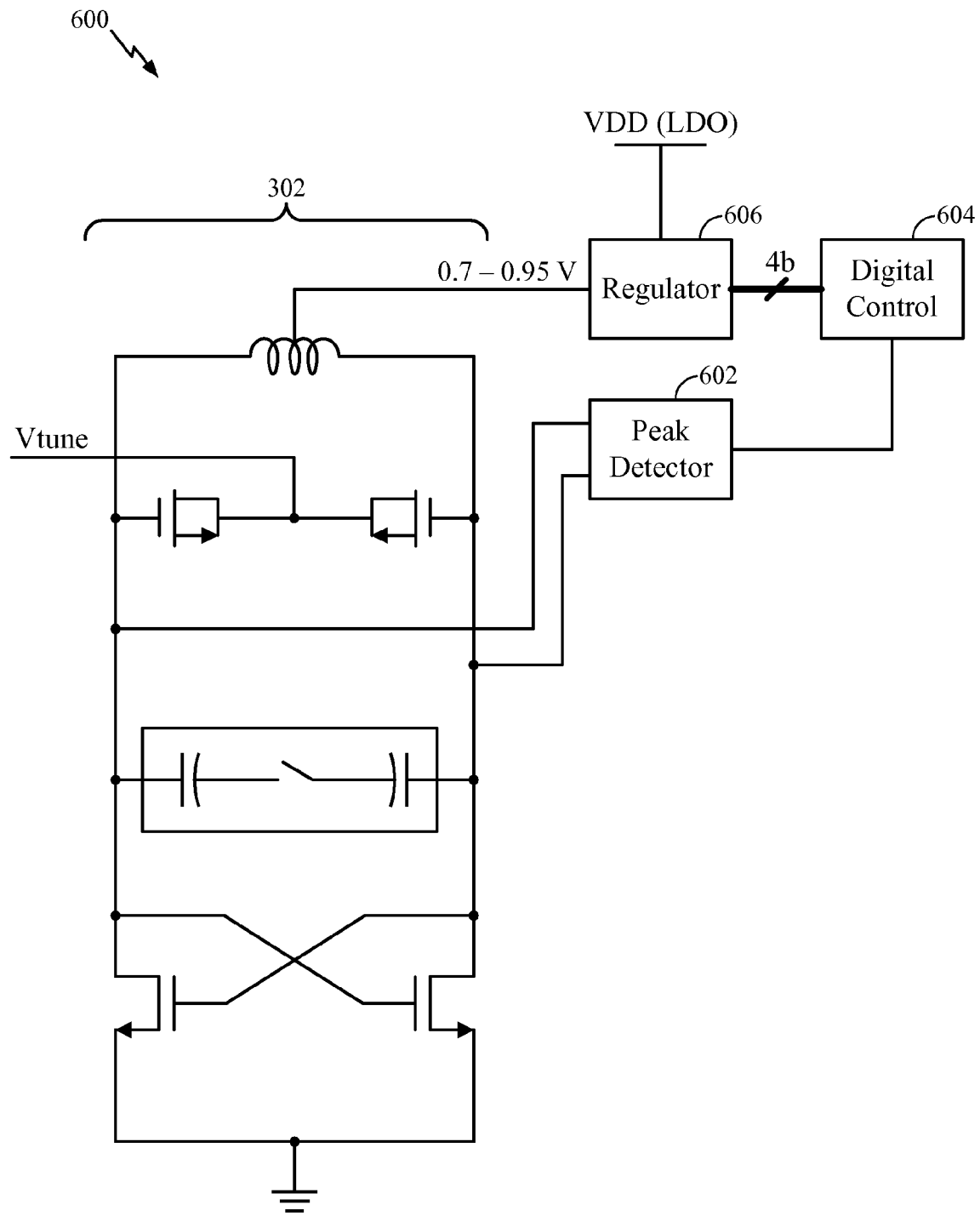
FIG. 6 is a block diagram of an example voltage-controlled oscillator (VCO) with a voltage regulator controlled by a feedback loop with a peak detector.

Therefore, a feedback loop may be added to the voltage regulating circuit 500, as illustrated by the block diagram 600 of FIG. 6. As described above, a voltage regulator 606, such as the voltage regulating circuit 500, provides a regulated voltage (Vreg) for powering the VCO 302. A peak detector 602 may be used to sense the VCO swing from the inductor-capacitor (LC) tank circuit in the VCO 302, and based on the detected peaks of the VCO swing, a digital control 604 may output one or more control signals control the voltage regulator 606. For example, the control signals may adjust the variable reference current source 304 and/or the variable resistance (Rvar) in an effort to adjust Vref, which in turn adjusts the bias voltage at the gate of transistor M3 and the VCO current.

Despite these additions, the control loop in FIG. 6 is complex, slow, and typically entails calibration before normal operation. Moreover, the peak detector 602 not only has limited resolution, but also adds extra load to the VCO 302, thereby degrading VCO performance (e.g., tuning range).

Accordingly, what is needed is a power efficient, low noise, and PVT-insensitive regulator for providing a regulated voltage/current for a low power, high performance VCO.

Certain aspects of the present disclosure provide a power efficient, low noise, and PVT insensitive regulator for VCOs. The regulator is based on source follower topology to inject less noise into the VCO and may reuse the reference current as part of the VCO current to avoid wasting power. In contrast with sensing the regulator voltage, certain other aspects of the present disclosure sense the VCO current and use another feedback loop to adjust the VCO current to a reference current.

Example Voltage Regulating Circuit with Reused Reference Current

FIG. 7A is a schematic diagram of an example voltage regulating circuit 700, in accordance with certain aspects of the present disclosure. The circuit 700 combines a low-impedance current mirror with an NMOS cascode source follower, and the reference current is supplied as part of the VCO current.

NMOS transistors M3 and M4 compose the NMOS source follower, as well as the main branch of the NMOS current mirror, supplying current $I_2$ to the VCO 302. NMOS transistors M5 and M6 compose the bias branch of the NMOS current mirror, where the reference current source 304 provides the reference current (Iref=$I_1$), which is added to $I_2$ at the reference voltage node to provide the VCO current (=$I_1+I_2$). In this power efficient manner, the reference current is reused as part of the VCO current, rather than being wasted as in the circuit 300 of FIG. 3. The main branch of the current mirror receives power from a first power supply level 702 (VDD), whereas the bias branch receives power from a second power supply level 704 (VDD_H) having a higher voltage than the first level 702.

In the voltage regulating circuit 700, the reference current (also known as the bias current) is insensitive to process, voltage, and temperature variations. The VCO current is equal to N*Iref. The circuit 700 has lower phase noise and is more power efficient than the circuit 300 of FIG. 3 and is PVT-insensitive, less complex, and more power efficient than the circuit 500 of FIG. 5. The compact solution of circuit 700 also offers power supply isolation.

Figure 7B:
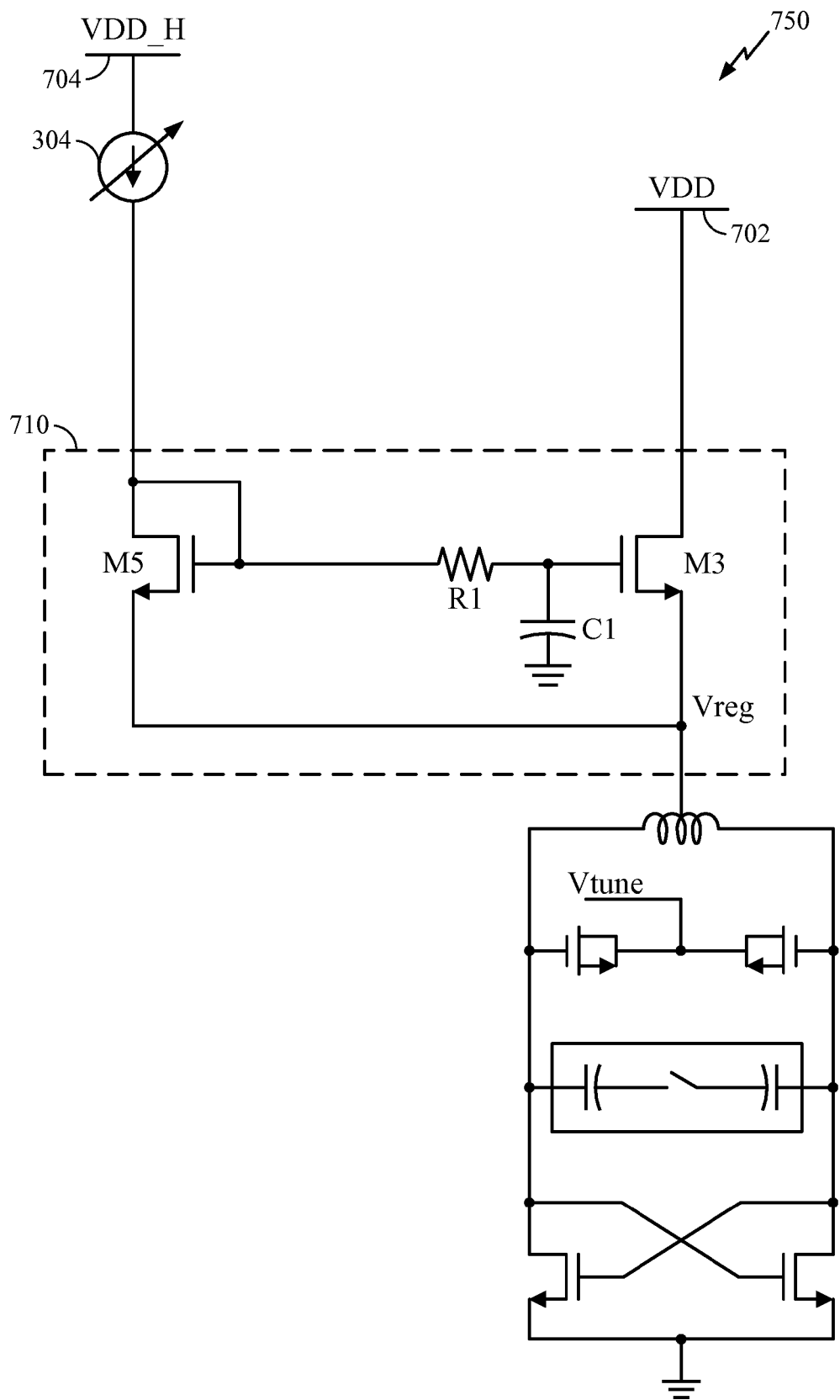
FIG. 7B is a schematic diagram of an example voltage regulating circuit using an NMOS source follower where the reference current is supplied as part of the VCO current, in accordance with certain aspects of the present disclosure.

FIG. 7B is a schematic diagram of an example voltage regulating circuit 750, in accordance with certain aspects of the present disclosure. Similar to the circuit 700 in FIG. 7A, the circuit 750 in FIG. 7B uses an NMOS current mirror 710 and an NMOS source follower, and the reference current is supplied as part of the VCO current. Rather than transistors in cascode, however, the circuit 750 uses only a single NMOS transistor M3 in the source follower and main branch of the current mirror 710 and only a single NMOS transistor M5 in the bias branch.

Figure 7C:
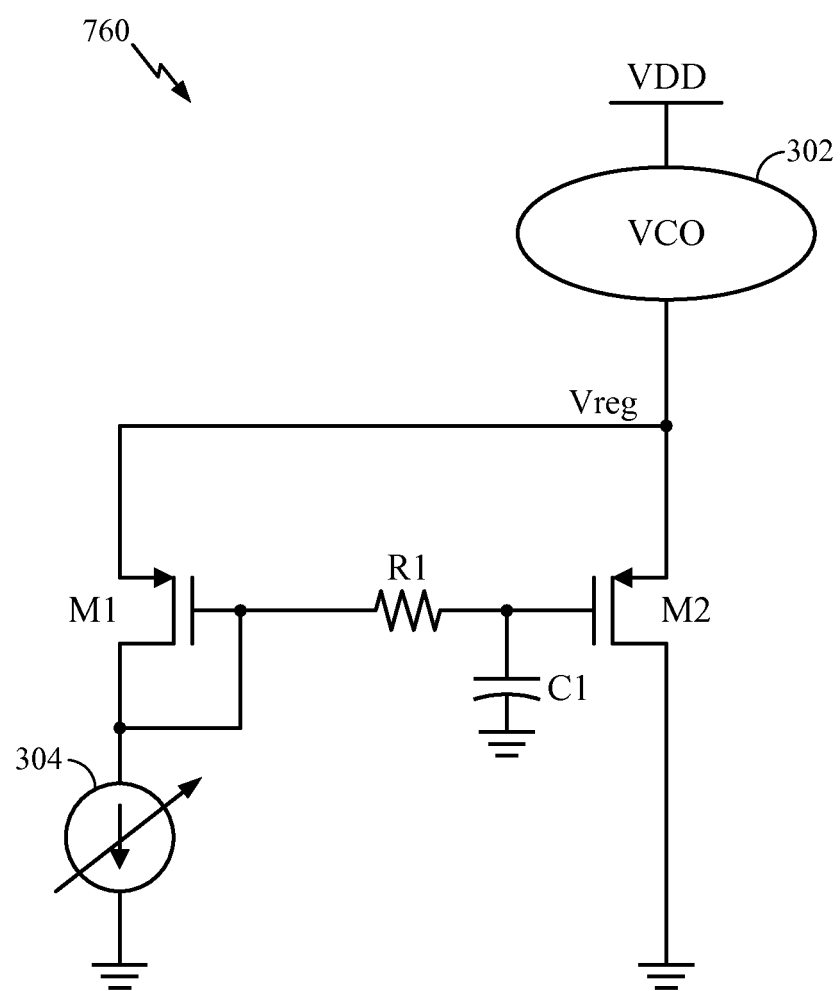
FIG. 7C is a schematic diagram of an example voltage regulating circuit using a PMOS source follower where the reference current is sunk from part of the VCO current, in accordance with certain aspects of the present disclosure.

Since most all NMOS circuits have a PMOS equivalent and vice versa, FIG. 7C is a schematic diagram of an example voltage regulating circuit 760 using a PMOS source follower and PMOS current mirror, in accordance with certain aspects of the present disclosure. The circuit 760 is similar to the circuit 750 in FIG. 7B, except that reference current source 304 sinks, rather than sources, the reference current from part of the VCO current at the regulated voltage node (at the source of PMOS transistors M1 and M2).

Figure 8:
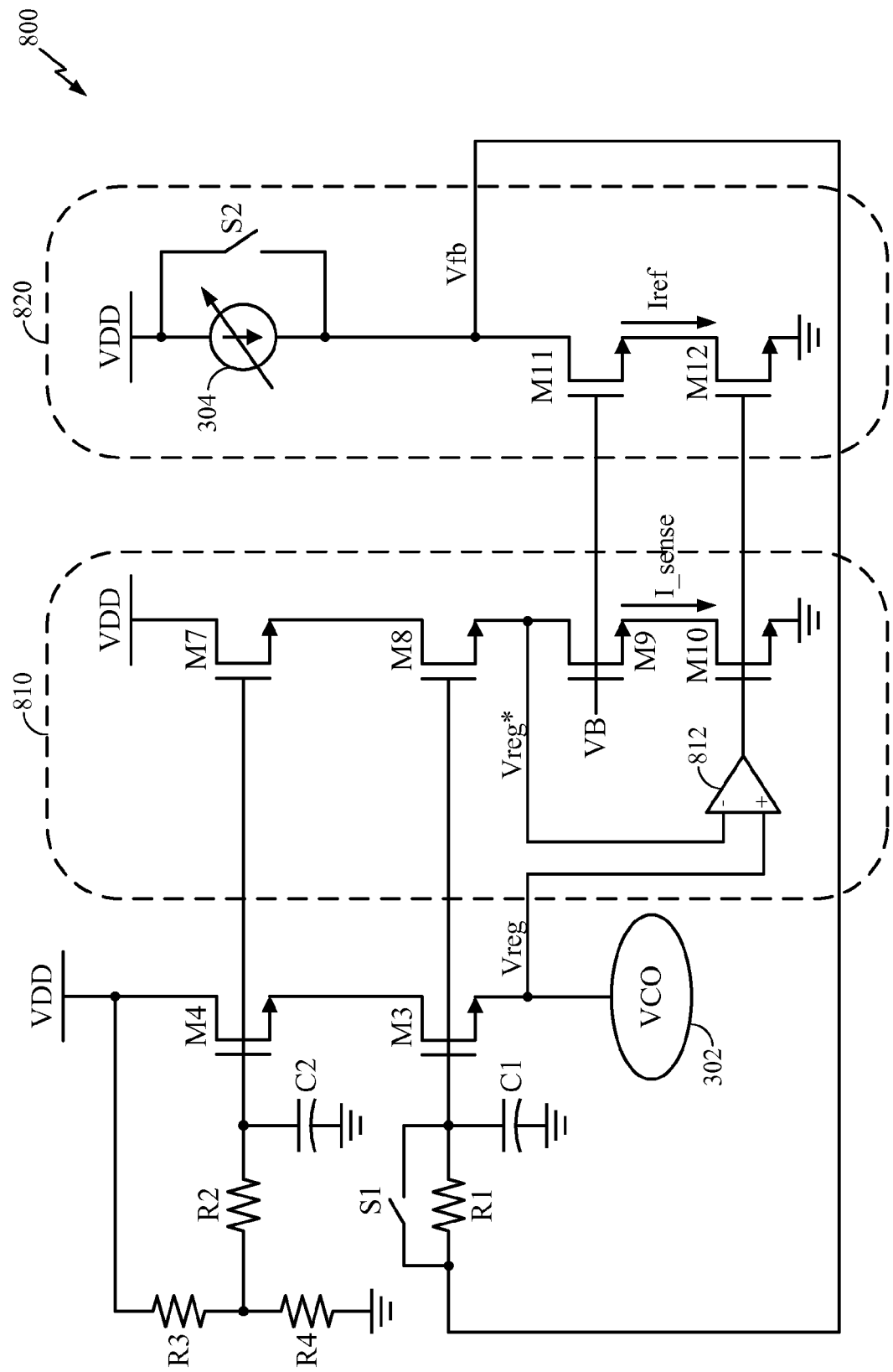
FIG. 8 is a schematic diagram of an example voltage regulating circuit using an NMOS cascode source follower, a current sensing circuit, and a current mode comparator providing feedback to the source follower, in accordance with certain aspects of the present disclosure.

Example Voltage Regulating Circuit with Current Sensing Circuit, Current Mode Comparator, and Feedback FIG. 8 is a schematic diagram of an example voltage regulating circuit 800 using an NMOS cascode source follower, a current sensing circuit 810, and a current mode comparator 820 providing feedback to the source follower, in accordance with certain aspects of the present disclosure. Providing current to drive the VCO 302, the source follower comprises NMOS transistors M3 and M4 and is similar to the NMOS cascode source follower in the circuits 400, 500 of FIGS. 4 and 5, respectively. However, the feedback in the circuit 800 is provided to the gate of transistor M3 from the current mode comparator 820.

The current sensing circuit 810 comprises four NMOS transistors M7, M8, M9, and M10 in cascode. The gate of transistor M4 is connected to the gate of transistor M7 to similarly bias transistors M4 and M7. The gate of transistor M3 is connected to the gate of transistor M8. The regulated voltage (Vreg) at the output of the source follower (i.e., the source of transistor M3) is sensed by the positive terminal of operational amplifier (op amp) 812. The gate of transistor M9 is biased by a bias voltage (VB). The negative terminal of the amplifier 812 is connected to a node (Vreg*) between the source of transistor M8 and the drain of transistor M9, and the amplifier 812 drives the gate of transistor M10, such that Vreg* at the negative terminal is nearly equal to Vreg at the positive terminal.

The current mode comparator 820 includes a reference current source 304 for supplying a reference current (Iref) and two NMOS transistors M11 and M12. The gate of transistor M11 is biased by a bias voltage, such as VB biasing the gate of transistor M9 in the current sensing circuit 810. The gate of transistor M12 is connected to the output of the amplifier 812 in the current sensing circuit 810. In this manner, transistors M11 and M12 are driven similarly to transistors M9 and M10, but may have different currents. Iref passes through both transistors M11 and 12, thereby creating a feedback voltage (Vfb) at the drain of transistor M11. Connected to the gates of transistors M3 and M8 via resistor R1, the feedback voltage is adjusted up or down as the output of amplifier 812 changes. The current (I_sense) through transistors M9 and M10 is adjusted as the output of amplifier 812 changes to maintain Vreg* equal to Vreg. The current mode comparator 820 is not limited to the circuit shown in FIG. 8 and may include any components used to compare the sensed current (I_sense) with the reference current (Iref).

For certain aspects, the circuit 800 may include a switch S1 to short the resistor R1 during startup, whereas the switch S1 may be open during normal operation of the circuit. The circuit 800 may also include a switch S2 to pull up the gate of transistor M3 during startup. Switch S2 may be open during normal operation.

The VCO current provided by the circuit 800 of FIG. 8 is PVT-insensitive and is equal to N*Iref, where N is the ratio of I_sense to the VCO current. The circuit 800 is also suitable for scaled CMOS and low-voltage applications.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for receiving may comprise a receiver (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for processing or means for determining may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A circuit for providing an output voltage, comprising:
a current source configured to supply or sink a reference current; and
a current mirror having a bias branch and a main branch, wherein the bias branch is connected with the current source, wherein the main branch includes a source follower to provide the output voltage at an output of the main branch, and wherein the output of the bias branch and an output of the main branch are coupled to an output of the circuit such that at least a portion of the reference current is combined with a branch current through the main branch and flows to the output of the circuit, wherein the current source is provided a first power supply voltage and the main branch of the current mirror is provided a second power supply voltage, wherein the first power supply voltage has a higher voltage than the second power supply voltage, and wherein the first power supply voltage and the second power supply voltage have higher voltages than the output voltage.

2. The circuit of claim 1, wherein the bias branch comprises a first transistor, wherein the main branch comprises a second transistor, and wherein a gate of the first transistor is connected with a gate of the second transistor.

3. The circuit of claim 2, wherein the bias branch comprises a third transistor connected in cascode with the first transistor, wherein the main branch comprises a fourth transistor connected in cascode with the second transistor, and wherein a gate of the third transistor is connected with a gate of the fourth transistor.

4. The circuit of claim 3, wherein the gate of the third transistor is biased using a voltage divider, wherein the second power supply voltage is provided to the voltage divider.

5. The circuit of claim 3, wherein the gate of the third transistor is connected with the gate of the fourth transistor via a first low pass filter and wherein the gate of the first transistor is connected with the gate of the second transistor via a second low pass filter.

6. The circuit of claim 3, wherein a drain of the third transistor is connected with the current source and the gate of the first transistor, wherein a source of the third transistor is connected with a drain of the first transistor, and wherein a source of the first transistor is connected with the output of the circuit.

7. The circuit of claim 3, wherein the second power supply voltage is provided to a drain of the fourth transistor, wherein a source of the fourth transistor is connected with a drain of the second transistor, and wherein a source of the second transistor is connected with the output of the circuit.

8. The circuit of claim 3, wherein the first, second, third, and fourth transistors comprise n-channel metal-oxide semiconductor (NMOS) field-effect transistors.

9. The circuit of claim 2, wherein a drain of the first transistor is connected with the gate of the first transistor.

10. The circuit of claim 1, wherein the reference current and the branch current through the main branch compose a regulator current, and wherein the regulator current is substantially insensitive to variations in process technology, power supply voltage, and temperature.

11. The circuit of claim 1, wherein the current source comprises a variable current source.

12. The circuit of claim 1, wherein the current mirror comprises a low impedance current mirror.

13. The circuit of claim 1, wherein the source follower comprises a p-channel metal-oxide semiconductor (PMOS) field-effect transistor.

14. A circuit for providing an output voltage, comprising:
a source follower configured to provide the output voltage and a regulated output current;
a current sensing circuit configured to generate a sensing current based on the regulated output current;
a current source configured to generate a reference current; and
a current mode comparator configured to compare the sensing current with the reference current and control a bias of the source follower based on the comparison, wherein a power supply voltage is provided to the source follower, the current sensing circuit, the current source, and the current mode comparator, wherein the source follower comprises a first transistor and a second transistor connected in series, wherein a gate of the first transistor is biased using a voltage divider configured to reduce a voltage of the power supply voltage.

15. The circuit of claim 14, wherein the regulator current is substantially insensitive to variations in process technology, a voltage of the power supply voltage, and temperature.

16. The circuit of claim 14, wherein a source of the first transistor is connected with a drain of the second transistor and wherein a source of the second transistor is connected with an output of the circuit.

17. The circuit of claim 16, wherein an output of the current mode comparator is connected with a gate of the second transistor via a low pass filter.

18. The circuit of claim 17, further comprising a switch in parallel with a resistor of the low pass filter, wherein the switch is closed during start-up of the circuit and wherein the switch is open during normal operation of the circuit.

19. The circuit of claim 14, wherein the current sensing circuit comprises third, fourth, fifth, and sixth transistors connected in series.

20. The circuit of claim 19, wherein the power supply voltage is provided to a drain of the third transistor, wherein a gate of the third transistor is connected with a gate of the first transistor, wherein a source of the third transistor is connected with a drain of the fourth transistor, wherein a gate of the fourth transistor is connected with a gate of the second transistor, wherein a source of the fourth transistor is connected with a drain of the fifth transistor, and wherein a source of the fifth transistor is connected with a drain of the sixth transistor.

21. The circuit of claim 20, wherein the current sensing circuit comprises an amplifier having a negative input, a positive input, and an output, wherein the negative input is connected with an output of the circuit, wherein the positive input is connected with at least one of the source of the fourth transistor or the drain of the fifth transistor, and wherein the output of the amplifier is connected with a gate of the sixth transistor, such that the sensing current flows through the third, fourth, fifth, and sixth transistors.

22. The circuit of claim 21, wherein a gate of the fifth transistor is biased by a bias voltage.

23. The circuit of claim 22, wherein the gate of the fifth transistor is configured to be connected with an electrical ground for the power supply voltage during start-up of the circuit.

24. The circuit of claim 21, wherein the current mode comparator comprises a seventh transistor and an eighth transistor connected in series, wherein a drain of the seventh transistor is connected with the current source and with the gate of the second transistor to form a feedback loop for controlling the bias of the source follower, wherein a gate of the seventh transistor is connected with a gate of the fifth transistor, wherein a source of the seventh transistor is connected with a drain of the eighth transistor, and wherein a gate of the eighth transistor is connected with a gate of the sixth transistor.

25. The circuit of claim 19, wherein the first, second, third, fourth, fifth, and sixth transistors comprise n-channel metal-oxide semiconductor (NMOS) field-effect transistors.

26. The circuit of claim 14, further comprising a switch in parallel with the current source, wherein the switch is closed during start-up of the circuit and wherein the switch is open during normal operation of the circuit.

* * * * *